United States Patent
Ustyuzhanin et al.

(10) Patent No.: US 12,500,735 B2
(45) Date of Patent: Dec. 16, 2025

(54) PARTIALLY HOMOMORPHIC ENCRYPTION (PHE) IN DISTRIBUTED 1-BIT LARGE LANGUAGE MODEL (LLM) ARCHITECTURE

(71) Applicants: Constructor Technology AG, Schaffhausen (CH); Constructor☐Education☐and Research Genossenschaft, Schaffhausen (CH)

(72) Inventors: Andrey Ustyuzhanin, Singapore (SG); Sergey Ulasen, Singapore (SG); Alexander Tormasov, Bremen (DE); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

( * ) Notice: Subject to any disclaimer, the term of this patent is extended or adjusted under 35 U.S.C. 154(b) by 0 days.

(21) Appl. No.: 19/169,111

(22) Filed: Apr. 3, 2025

(65) Prior Publication Data
US 2025/0317274 A1    Oct. 9, 2025

Related U.S. Application Data

(60) Provisional application No. 63/575,099, filed on Apr. 5, 2024.

(51) Int. Cl.
*H04L 9/00*    (2022.01)
*G06F 17/16*   (2006.01)

(52) U.S. Cl.
CPC .............. *H04L 9/008* (2013.01); *G06F 17/16* (2013.01)

(58) Field of Classification Search
CPC ................................. H04L 9/008; G06F 17/16
See application file for complete search history.

(56) References Cited

U.S. PATENT DOCUMENTS

| | | | |
|---|---|---|---|
| 9,129,089 B2 * | 9/2015 | DiAcetis | G06F 21/10 |
| 2021/0272011 A1 * | 9/2021 | Yonetani | G06N 3/045 |
| 2023/0325529 A1 * | 10/2023 | Sav | G06F 21/6245 726/26 |

OTHER PUBLICATIONS

Wang et al. (NPL: BitNet: Scaling 1-bit Transformers for Large Language Models, arXiv:2310.11453v1, Oct. 17, 2023) (Year: 2023).*

* cited by examiner

*Primary Examiner* — Meng Li
(74) *Attorney, Agent, or Firm* — ArentFox Schiff LLP; Michael Fainberg

(57) ABSTRACT

A system determines whether a first operation performed by an MLM is compatible with a specific encryption scheme, wherein the MLM is distributed over at least one client device and at least one server. In response to determining that the first operation is compatible with the specific encryption scheme, the system encrypts data associated with the first operation using the specific encryption scheme, and transmits the encrypted data to the at least one server configured to apply the first operation. In response to determining that the first operation is incompatible with the specific encryption scheme, the system performs the first operation on the data using the at least one client device without encrypting using the specific encryption scheme.

20 Claims, 10 Drawing Sheets

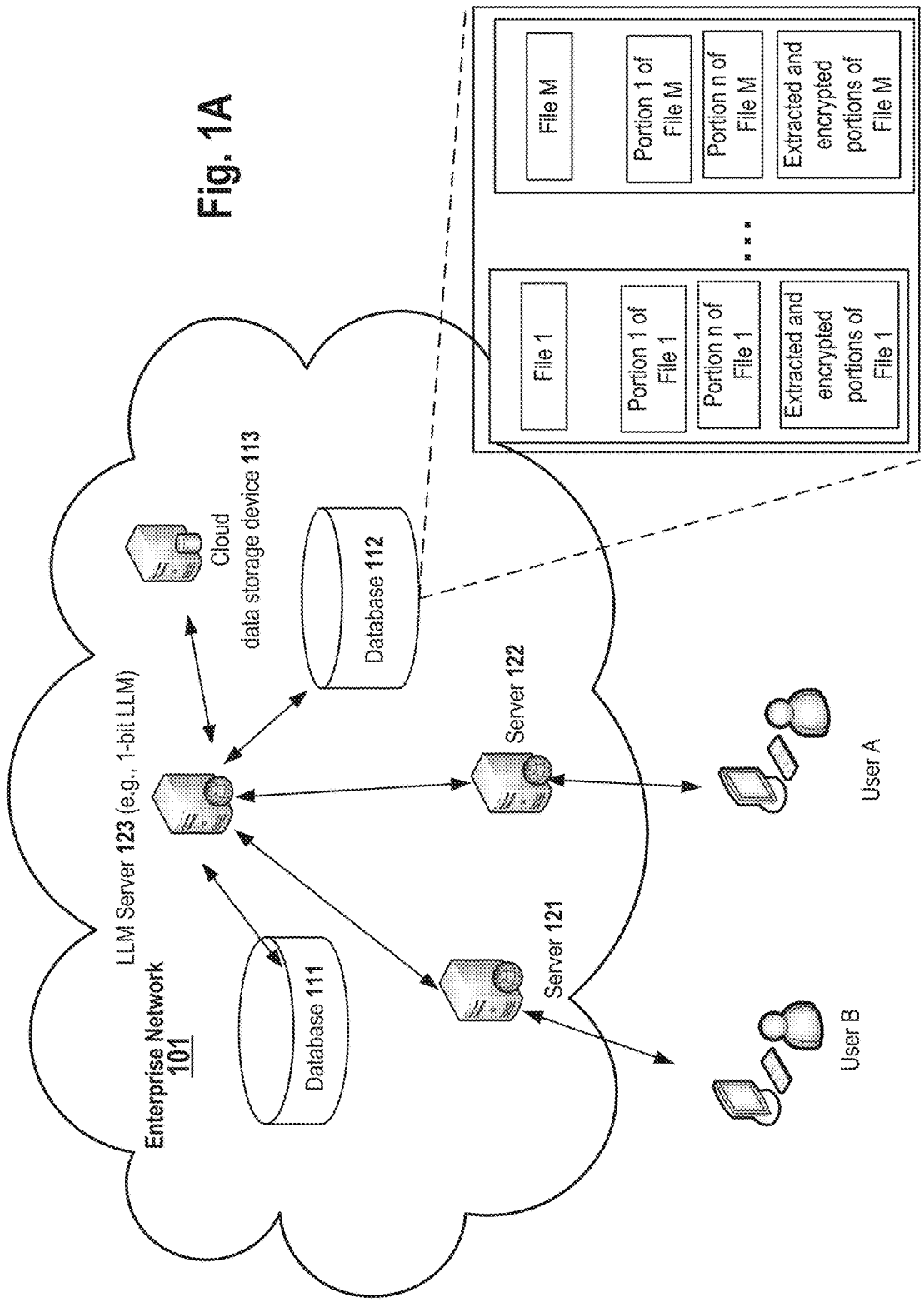

PARTIALLY HOMOMORPHIC ENCRYPTION (PHE) IN DISTRIBUTED 1-BIT LARGE LANGUAGE MODEL (LLM) ARCHITECTURE

CROSS-REFERENCE TO RELATED APPLICATIONS

This application claims the benefit of U.S. Provisional Application No. 63/575,099, filed Apr. 5, 2024, which is herein incorporated by reference.

FIELD OF TECHNOLOGY

The present disclosure relates to the field of machine learning (ML), and more specifically to secure a 1-bit large language model (LLM) deployment using partially homomorphic encryption (PHE).

BACKGROUND

Large Language Models (LLMs) have revolutionized the field of natural language processing (NLP) by enabling machines to understand, generate, and interact with human language in ways that were previously unimaginable. These models, such as OpenAI's GPT-4 and Google's Gemini, are built on deep neural network architectures and trained on vast amounts of text data, allowing them to perform a wide range of tasks, from text generation and translation to sentiment analysis and question answering.

However, the impressive capabilities of LLMs come at a significant cost. One of the primary challenges associated with LLMs is their substantial memory and processing requirements. Training and deploying these models demand enormous computational resources, including high-performance GPUs and extensive memory capacity. This not only makes the development and maintenance of LLMs expensive but also limits their accessibility to organizations with substantial computational infrastructure.

Moreover, the extensive data requirements and complex architectures of LLMs raise significant security concerns, particularly when dealing with private and sensitive data. During the training process, LLMs ingest vast amounts of data, which may include confidential information. If not properly managed, this data can be exposed to unauthorized access or misuse. Additionally, the inference process, where the model generates outputs based on new inputs, can also be vulnerable to security breaches. Without robust encryption and access control mechanisms, sensitive information processed by LLMs can be at risk of being compromised.

In this context, it is crucial to develop methods that not only optimize the memory and processing efficiency of LLMs but also ensure the security and privacy of the data they handle.

SUMMARY

Aspects of the disclosure relate to systems, methods, and computer program products for providing secure 1-bit LLM deployment for an enterprise using partially homomorphic encryption (PHE).

In an exemplary aspect, the techniques described herein relate to a method for securely executing a machine learning model (MLM), the method including: determining whether a first operation performed by an MLM is compatible with a specific encryption scheme, wherein the MLM is distributed over at least one client device and at least one server; in response to determining that the first operation is compatible with the specific encryption scheme: encrypting data associated with the first operation using the specific encryption scheme; and transmitting the encrypted data to the at least one server configured to apply the first operation; and in response to determining that the first operation is incompatible with the specific encryption scheme, performing the first operation on the data using the at least one client device without encrypting using the specific encryption scheme.

In some aspects, the techniques described herein relate to a method, wherein the specific encryption scheme is PHE.

In some aspects, the techniques described herein relate to a method, wherein the MLM is a 1-bit LLM.

In some aspects, the techniques described herein relate to a method, wherein the data is input data provided by a user, further including: receiving, by the at least one client device, a result of the first operation from the at least one server; and determining a decrypted value from the result using a decryption key associated with the specific encryption scheme.

In some aspects, the techniques described herein relate to a method, further including: outputting the decrypted value on the at least one client device.

In some aspects, the techniques described herein relate to a method, further including: determining whether a second operation performed by the MLM is compatible with the specific encryption scheme; in response to determining that the second operation is incompatible with the specific encryption scheme, performing the second operation on the decrypted value using the at least one client device without encrypting using the specific encryption scheme.

In some aspects, the techniques described herein relate to a method, further including: determining whether a second operation performed by the MLM is compatible with the specific encryption scheme; in response to determining that the second operation is compatible with the specific encryption scheme, performing the second operation on a result of the first operation applied to the encrypted data.

In some aspects, the techniques described herein relate to a method, wherein determining whether the first operation is compatible with the specific encryption scheme includes determining whether the first operation can be reduced to one or more addition operations.

In some aspects, the techniques described herein relate to a method, wherein the first operation includes matrix multiplication.

In some aspects, the techniques described herein relate to a method, wherein the first operation includes a linear operation, further including: converting the linear operation into one or more addition operations.

It should be noted that the methods described above may be implemented in a system comprising at least one hardware processor and memory. Alternatively, the methods may be implemented using computer executable instructions of a non-transitory computer readable medium.

In some aspects, the techniques described herein relate to a system for securely executing a machine learning model (MLM), the method including: at least one memory; and at least one hardware processor coupled with the at least one memory and configured, individually or in combination, to: determine whether a first operation performed by an MLM is compatible with a specific encryption scheme, wherein the MLM is distributed over at least one client device and at least one server; in response to determining that the first operation is compatible with the specific encryption scheme: encrypt data associated with the first operation using the specific encryption scheme; and transmit the encrypted data to the at least one server configured to apply the first operation; and in response to determining that the first operation is incompatible with the specific encryption scheme, perform the first operation on the data using the at least one client device without encrypting using the specific encryption scheme.

In some aspects, the techniques described herein relate to a non-transitory computer readable medium storing thereon computer executable instructions for securely executing a machine learning model (MLM), including instructions for: determining whether a first operation performed by an MLM is compatible with a specific encryption scheme, wherein the MLM is distributed over at least one client device and at least one server; in response to determining that the first operation is compatible with the specific encryption scheme: encrypting data associated with the first operation using the specific encryption scheme; and transmitting the encrypted data to the at least one server configured to apply the first operation; and in response to determining that the first operation is incompatible with the specific encryption scheme, performing the first operation on the data using the at least one client device without encrypting using the specific encryption scheme.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1A is a block diagram of an exemplary secure local LLM deployment in an enterprise.

DETAILED DESCRIPTION

Figure 1B:
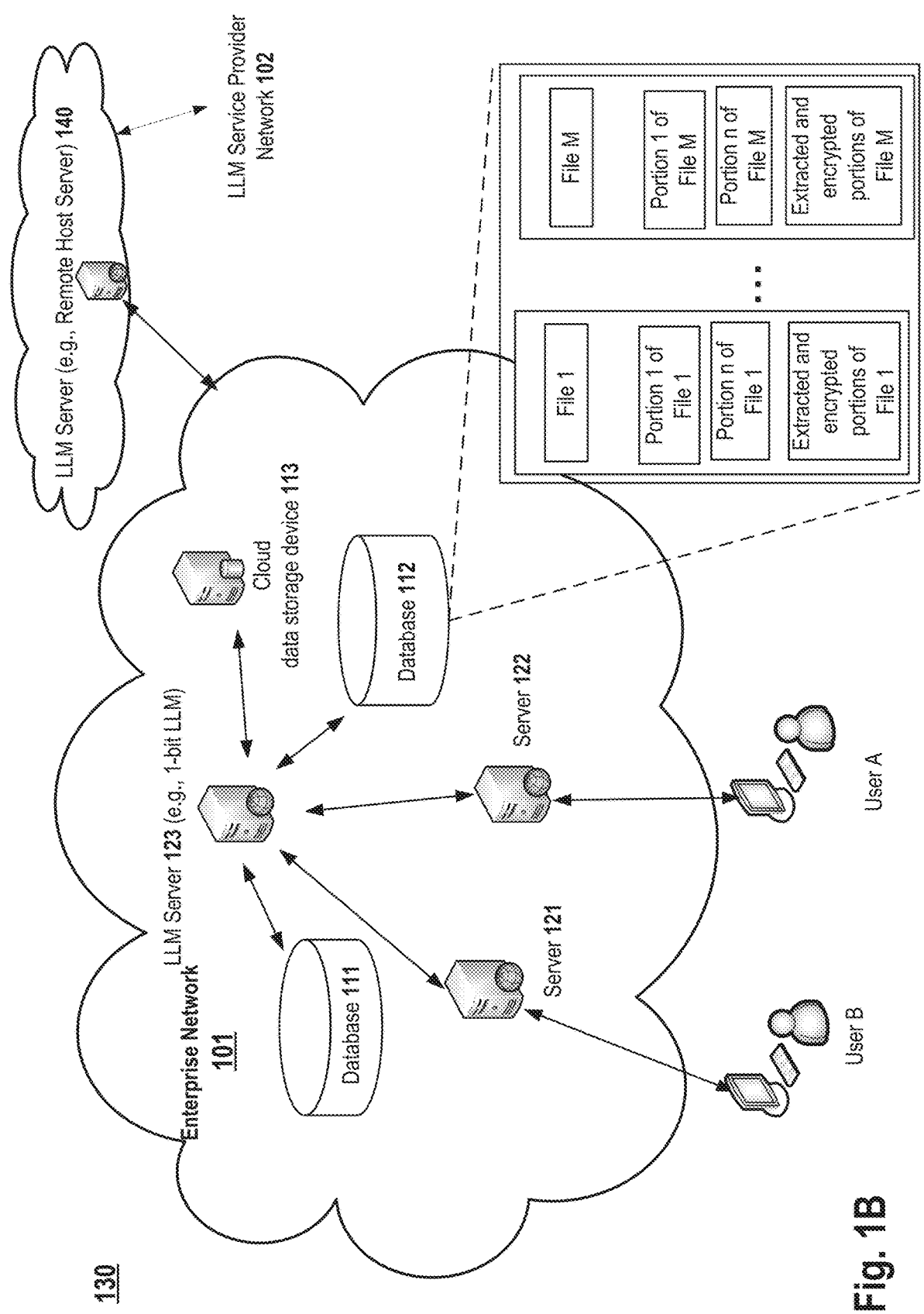
FIG. 1B is a block diagram of an exemplary secure hosted LLM deployment for an enterprise.

Exemplary aspects are described herein in the context of a system, method, and a computer program for providing a secure large language model (LLM) deployment in an enterprise IT environment. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

The present disclosure describes a secure 1-bit distributed LLM that offers security and computational efficiency. In general, a 1-bit LLM refers to a type of neural network model where the weights and possibly the activations are quantized to 1-bit precision. This means that instead of using the typical 32-bit or 16-bit floating-point numbers to represent the weights and activations, the model uses binary values (0 or 1). This quantization can significantly reduce the memory footprint and computational requirements of the model, making it more efficient in terms of storage and processing.

By using 1-bit precision, the amount of memory required to store the weights of the model is drastically reduced. This can be particularly beneficial for deploying large models on devices with limited memory, such as mobile phones or edge devices. The overall size of the model is also much smaller compared to traditional models with higher precision weights.

Furthermore, operations involving 1-bit values are generally faster and require less power compared to operations involving higher precision values. This can lead to faster inference times and lower energy consumption. The reduced precision can simplify the hardware requirements, allowing for the use of specialized hardware accelerators designed for binary operations.

In particular, 1-bit LLMs are well-suited for deployment on edge devices (e.g., client devices) where memory and computational resources are limited. This facilitates a distribution of the LLM. More specifically, the LLM architecture of the present disclosure is distributed between one or more client devices and one or more servers such that some operations of the LLM are executed on the client device(s) and some on the server(s). To address the security issues of conventional LLMs, data of certain operations of the LLM of the present disclosure are encrypted. In some aspects, the encryption is performed using partial homomorphic encryption (PHE). In some aspects, data of operations executed on the server are encrypted, whereas data of operations executed on the client device are unencrypted. This assures confidentiality of information without wasting resources on encryption where it is not needed (e.g., on a local client device).

In an exemplary aspect, all matrices of weights are represented in 1-bit format. In 1-bit format, there is no multiplication operation (because of data is binarized (−1, 0, 1) in INT8 format) and only addition operations and change of sign operations are performed. This makes matrix/vector operations on the matrices computationally faster than floating point matrix multiplication. In some aspects, input/output vector data is still represented in floating point format (FP16 format). Because PHE enables addition operations and does not conflict with 1-bit format, PHE may be used for encrypting certain data. The data associated with vector operations and other matrix operations that require multiplication and division is left unencrypted.

FIG. 1A illustrates a block diagram of an exemplary system 100 for providing a secure local LLM deployment in an enterprise network. In one aspect, the components of system 100 may be implemented on computer systems, such as that shown in FIG. 9.

In one aspect, system 100 includes an enterprise network 101 which includes at least servers 121-123. It is noted that system 100 includes any number of other network components and FIG. 1A only shows the components relevant for the illustrative example of the present disclosure. Users of the enterprise network 101 (e.g., employees or customers) communicate with devices in the enterprise network 101 via one of the servers, e.g., user A communicates with components of the enterprise network 101 via server 122, and user B communicates with components of the enterprise network 101 via server 121. Notably, certain operations of the 1-bit LLM of the present embodiment are implemented on LLM server 123.

In addition, enterprise network 101 includes any number of database servers, such as the database servers 111 and 112. In one aspect, data of the enterprise network may also be stored on a cloud storage device, such as the storage device 113 (also referred to as database server 113). Thus, files of the enterprise network may be stored in any of the database servers 111-113. For example, files 1-M, are shown as being stored on the database server 112. In one aspect, the files 1-M may contain any number of portions of data, with some portions being confidential data. Thus, at least some of the portions of the files 1-M may also be encrypted and stored on any of the database servers 111-113.

FIG. 1B illustrates a block diagram of an exemplary system 130 for providing a secure hosted LLM deployment on a remote server 140 for an enterprise. Thus, the system 130 is for the scenario in which the enterprise network accesses LLM functionality from a service provider (e.g., cloud service provider) rather than deploying the functionality on a server of the enterprise.

In one aspect, the system 130 includes an enterprise network 101 which includes at least servers 121-123. The enterprise network 101 is communicatively coupled to an LLM service provider network 102 for accessing LLM functionalities. That is, rather than deploying all of the LLM functionality on the enterprise network 101, the enterprise subscribes to the LLM functionality from a service provider. Users of the enterprise network 101 communicate with devices in the enterprise network 101 via one of the servers, e.g., user A communicates with components of the enterprise network 101 via server 122, and user B communicates with components of the enterprise network 101 via server 121. The LLM of service provider is implemented on the server 140 located in the LLM service provider's network 102.

To enable enterprise employees to use LLM services to intelligently search and query data files and documents stored in the enterprise database, in one exemplary aspect, the LLM server 140 may be configured to operate on the encrypted confidential data of the enterprise network 101. Particularly, in one aspect, the LLM server 140 may be configured to perform LLM training, LLM fine-tuning, and LLM inference (and any other required operations) using the encrypted data without being able to decrypt it, which provides a high-degree of security to the enterprise data. Thus, the 1-bit LLM functionality installed on LLM server 140 has no access to encrypted versions of the confidential data. Moreover, in another example aspect, the user prompts may also be encrypted to allow an even greater degree of confidentiality.

In another aspect where the LLM service provider is a trusted service provider and can have access to unencrypted data, the LLM server 140 accesses data stored in the database servers 111-113, and performs all LLM operations including the encrypting of the content stored on the database servers 111-113. In this scenario, the training, retraining, and fine-tuning of the LLM may be performed by the trusted service provider.

In one of the scenarios, a Large Language Model (LLM) is deployed on the service side in encrypted mode. The user wants to interact with the LLM while keeping the query and answer encrypted. In this case, the query is encrypted using Partially Homomorphic Encryption (PHE) and sent to the service side. The LLM processes this query using addition operations in PHE mode, generates results from these operations, and sends the results back to the user. The user then decrypts the results from the service, performs complex operations on their side, encrypts their results, and sends them again to the service. This back-and-forth exchange allows the service side to manage the bulk of the addition operations, which are the most frequent and thus computationally consuming. Ultimately, the user obtains the final result, while most of the computational load remains on the service side. However, the service does not have access to the query, response, or intermediate results, as they are encrypted and processed in PHE mode. Consequently, the service remains unaware of the details of the query and response.

In one embodiment between the service and user, there is a gateway that can transform PHE to standard encryption, allowing the user to decipher using light standard encryption. There is also a gateway that can work in the opposite direction.

For an illustrative non-limiting example, suppose the enterprise network comprises a hospital network with users having access to different portions of data stored in various databases of the hospital. In one aspect, the hospital may obtain LLM services from a trusted service provider. The trusted service provider may then access the data, encrypt the data as needed, set up access lists (if applicable) for various groups of users (e.g., doctors, nurses, administrators, IT personal, etc.), provide decryption keys to users allowed to access certain portions of data, etc. For example, portions of the medical records containing patients' names may be encrypted, but the information about patient's medical condition, treatment protocols and the results of the treatment may remain unencrypted. The LLM may be trained on these partially encrypted filed. When a query is received from a user for an LLM service (e.g., search for information about successful treatment of a particular medical condition), after authenticating the user and checking his access level, the inference module of the LLM server may generate a response to the user prompt. For example, the LLM, which was trained on the patient records, may identify successful treatment cases and summarize conditions of patients and their treatment protocols without revealing patients' names if users access level prohibits access to this information.

Figure 2:
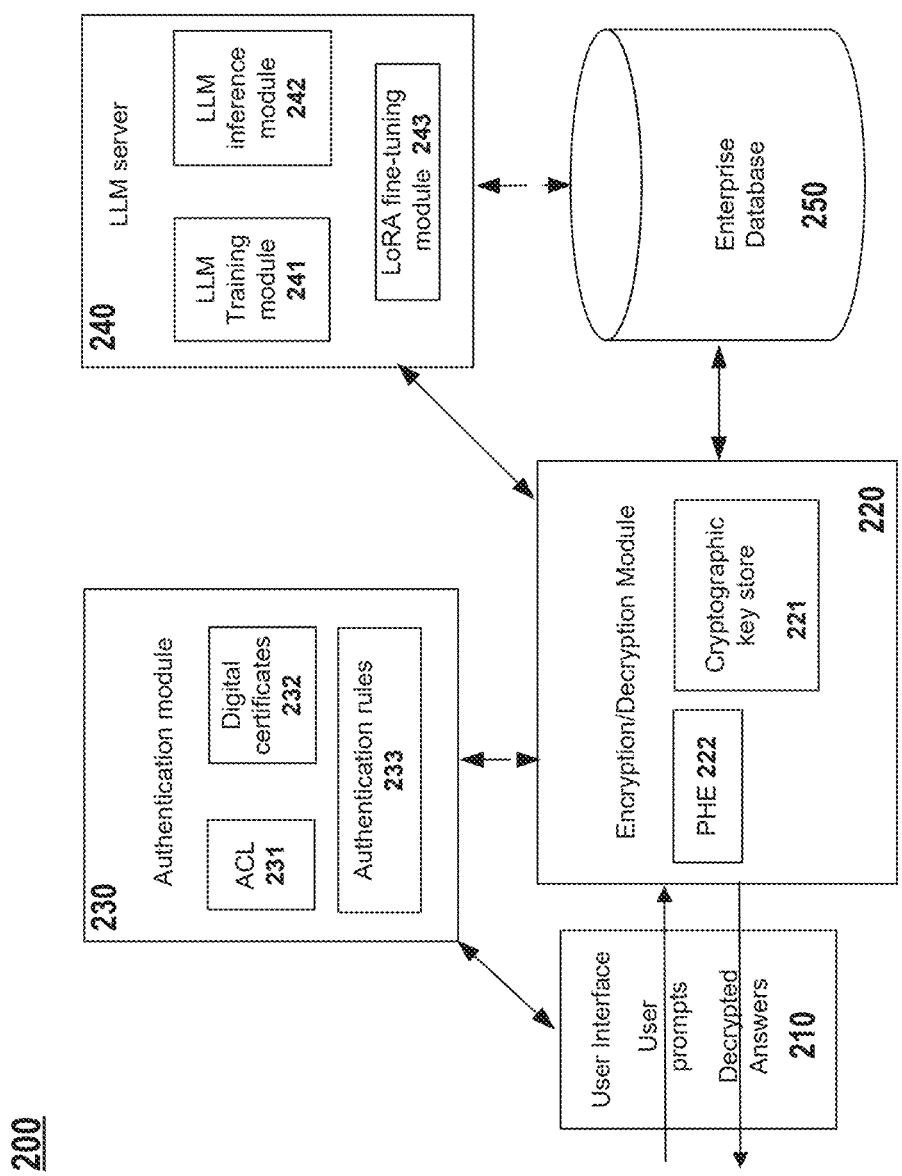
FIG. 2 is a block diagram of exemplary functional modules of the secure LLM deployment for an enterprise.

FIG. 2 is an example of a block diagram of functional modules of the system 200 for secure LLM deployment for an enterprise according to one exemplary aspect. Some of these functional modules may be deployed locally on the servers of the enterprise network 101 or hosted on a remote server such as server 140. In one example aspect, the system 200 includes the following functional modules: a user interface 210, an encryption/decryption module 220, an authentication module 230, an LLM server 240, and enterprise databases 250.

In one aspect, the user interface 210 is designed to enable user endpoint devices to access enterprise's LLM functionality in a secure and confidential manner. User interface 210 may be implemented as web-based interface or a desktop application. The user interface 210 allows users to use text prompts to perform text-based searches for documents in enterprise database 250, to query the LLM server 240 for answers to specific questions related to the documents and files stored in the enterprise database 250, or, depending on the natural language processing capabilities of the LLM server 240, to simulate a conversation with the LLM server 240 on topics related to the documents contained in the database 250 or other topics on which the LLM server 240 has been trained to answer. In one aspect, the access to the LLM services and/or to confidential documents in the enterprise database 250 is allowed to authenticated users only and/or users who have an appropriate level of access (e.g., doctors, administrators, IT staff, etc.).

In one aspect, the authentication module 230 is provided to enable authentication of users that access LLM services of the enterprise via the interface 210. In one example, the authentication may be performed using an Access Control List (ACL) 231, identifying individual users and their respective access level to documents in the enterprise database. In another example, the authentication can be performed using cryptographic techniques, such as digital certificates 232 associate with individual users. Yet in another example, various authentication rules 233 may be used to specify the access level of individual users or groups/categories of users, what confidential data is accessible to the users, whether user's LLM prompts should be encrypted, etc. Alternatively, a combination of these and other known authentication techniques may be used.

For example, if a user query does not include the key(s) associated with an authorized user (as indicated in ACL 231), basic unencrypted LLM data and matrices are used. If the keys are provided, depending on the level of access, whole matrices and LLM data with both encrypted and encrypted data may be used. In some aspects, different LLMs are trained, each with a different amount of access to data. For example, a limited LLM may be able to provide simple answers without confidential data. A full LLM may provide more advanced answers for users having access keys.

In order to access LLM services external to the enterprise while maintaining the security of user prompts and confidential enterprise data, the enterprise may encrypt its confidential data using homomorphic encryption that allows LLM server 240 to perform operations on the encrypted data without decryption thereof. In one example, the encryption/decryption module 220 is deployed on a server in the enterprise network 101 and configured to perform encryption/decryption of confidential data using PHE 222. An advantage of using PHE is that it is more efficient than FHE in terms of computational load, particularly for 1-Bit LLM implementations.

Furthermore, since homomorphic encryption used by the module 220 is a form of asymmetric encryption algorithm that uses private/public key pairs for encryption and decryption of data files, module 220 may store all generated cryptographic key pairs in a datastore 221. Furthermore, since module 220 may be also configured to encrypt user prompts, which provides an extra level of security and confidentiality to the enterprise, the cryptographic keys generated for each user to encrypt his/her prompts are also stored in the datastore 221.

PHE is a cryptographic technique that enables specific types of computations on encrypted data while maintaining its confidentiality. Unlike FHE, which allows arbitrary computations on encrypted data, PHE supports only certain operations (e.g., addition, multiplication—but not both simultaneously). Accordingly, when matrix operations involving addition or multiplication are performed by an LLM to generate outputs, the operations remain successful and generate proper results despite the encryption. In another example, suppose that the LLM is trained on a document that states "Mary was born on Jan. 1, 1990." If the birthdate is encrypted (suppose that the encrypted value generated using an encryption key is 123432), the modified document may state "Mary was born on 123432." The LLM may be trained using this modified document, which prevents the actual birthdate from being leaked/stolen. The trained LLM may generate an output stating "Mary's birthdate is 123432" to a user query "what is Mary's birthdate?". Here, the output includes the encrypted value of the birthdate. A user with a decryption key may be able to generate the statement "Mary's birthdate is Jan. 1, 1990" using this key.

In some aspects, the PHE used in the present disclosure may be the Paillier cryptosystem, which supports addition operations on encrypted values. This means that one can perform additions on ciphertexts without decrypting them first. PHE is valuable in scenarios where specific computations need to be performed on sensitive data while it remains encrypted, such as in privacy-preserving computations in the cloud or secure multi-party computations. By allowing limited operations on encrypted data, PHE strikes a balance between data utility and confidentiality, enabling practical applications of secure computation in various domains, including finance, healthcare, and decentralized systems. In some aspects, PHE schemes can be performed with a pair of keys based on, for example, RSA (a public-key cryptosystem). In other aspects, PHE schemes can be performed with a single key based on, for example, the Paillier cryptosystem.

In one example aspect, the system 200 further comprises an LLM server 240 that executes an LLM program. The LLM server 240 may be deployed on a local enterprise server, as shown in FIG. 1A, or on a remote host server, as shown in FIG. 1B. The LLM server 240 includes a LLM training module 242, LLM inference module 242, and LLM fine-tuning module 243. The training module 241 is configured to train LLM on files stored in enterprise database. In one aspect, an LLM may be trained both on the unencrypted files that do not contain any confidential data and encrypted files that contain confidential data. In another aspect, LLM may be pretrained using unencrypted files, and then fine-tuned by module 243 using encrypted files. Notably, PHE encryption allows LLM training, finetuning, and inference to be performed on the encrypted files. Particularly, matrix-vector mathematical operations can be performed on the encrypted data. This allows enterprise to use LLM services while maintaining the secrecy of the confidential data.

In one aspect, fine-tuning module 243 may implement Low-Rank Adaptation (LoRA) algorithm, which provides high-efficiency LLM optimization. For example, prompts and corresponding responses (e.g., samples from historical data) may be used for fine-tuning the LLM for a specific task. The fine-tuning using the LoRA technique involves differentiating new elements that are not well represented in previous training sets of data and modified elements that are recognized, but not adequately represented in previous training sets of data, and then modifying a small portion of weights of the model for performing the fine-tuning. Thus, the weights of the model affected by the new elements and modified elements are changed to improve the accuracy of the LLM training. In one aspect, the LoRA fine-tuning module 243 of the present disclosure is used to further optimize the performance on the PHE encrypted data. LoRA-related data may be stored separately and be encrypted, e.g., by the PHE algorithm, in the same way as described above.

In terms of training, the LLM may be trained through a process called unsupervised learning on a large dataset comprised of text from across various sources (e.g., webpages, documents, articles, etc.). The training begins by initializing the model with random parameters. The LLM then processes sequences of text, ranging from a few words to entire paragraphs, predicting the next word in each sequence. These predictions are compared to the actual next words in the dataset, and the model adjusts its parameters to minimize the difference between its predictions and the actual text. This process, known as backpropagation, is repeated iteratively over several (millions or possibly billions) text examples, allowing the model to learn intricate patterns, grammar rules, contextual understanding, and semantic relationships. The model's objective during training is to maximize the likelihood of generating the correct next word given a sequence of previous words. Additionally, fine-tuning techniques may be applied to adapt the model to specific tasks or domains, further enhancing its performance and applicability. Through this iterative process, the LLM gradually develops a nuanced understanding of language and can generate coherent and contextually appropriate responses to a wide range of queries.

Figure 3:
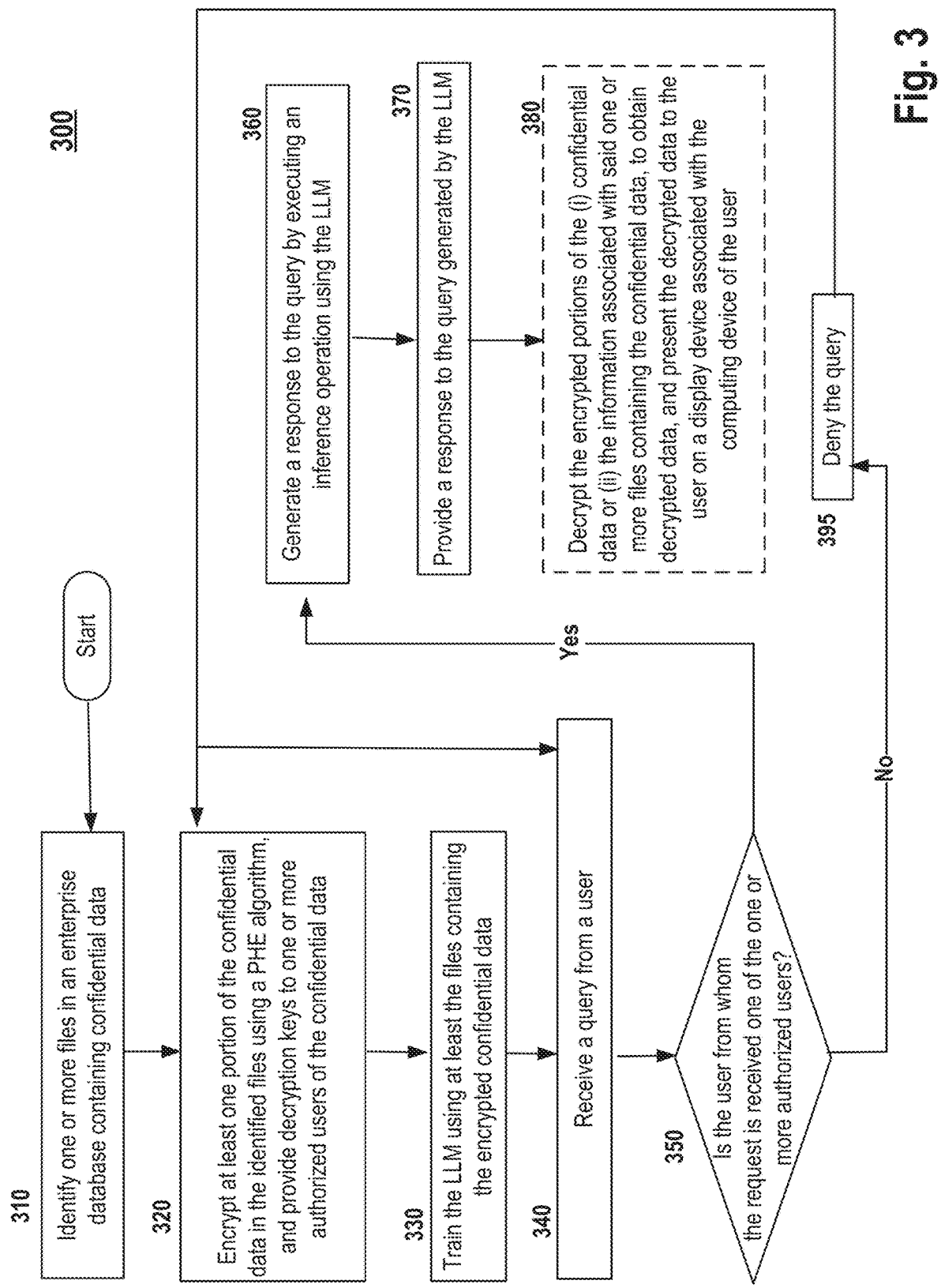
FIG. 3 illustrates a method for providing a secure LLM deployment in an enterprise.

FIG. 3 illustrates a method 300 for providing a secure LLM deployment in an enterprise in accordance with aspects of the present disclosure. In step 310, method 300 identifies one or more files in an enterprise database containing confidential data. The enterprise database is configured to limit access to the confidential data based on an encryption of the confidential data.

In one aspect, the limit to the access to the confidential data is further based on a user's access level. For example, user A may have a different access level from user B. Moreover, based on their respective roles in the enterprise, users A and B may have different needs for accessing different portions of the confidential data. For instance, if the enterprise is a hospital, doctors, nurses, patients, hospital administrators, IT personal etc., would have differing needs for accessing confidential data. Thus, an access control list (ACL) may be used to facilitate compliance to established policies and regulations. The ACL may be implemented on any of the servers of the enterprise. Gateway devices communicating with users may then access the ACL to determine whether access to confidential data is to be granted to a particular user. As mentioned above, a user may be granted access to specific portions of confidential data.

Thus, in one aspect, the determination of whether the user from whom the request is received is one of the one or more authorized users is further based on an ACL of the enterprise.

In step 320, by a server, method 300 encrypts at least one portion of the confidential data in the identified files using a partial homomorphic encryption (PHE) algorithm, and provides decryption keys to one or more authorized users of the confidential data.

In one aspect, the encrypting of the at least one portion of the confidential data further includes: identifying a plurality of matrix-vector operations, performed during the training of the LLM, that are associated with the confidential data; and encrypting the plurality of identified matrix-vector operations using the PHE algorithm, wherein encrypting further includes: encrypting the confidential data stored in the matrix, and encrypting logical operations performed on vector-matrix.

In step 330, by the server, method 300 trains the LLM using at least the files containing the encrypted confidential data. Once the training of the LLM is completed, the LLM server is ready to respond to prompts by performing an inference operation.

In one aspect, the LLM is a 1-bit LLM where an operation of multiplication of matrix to vector is efficiently replaced by changes of sign and addition.

In one aspect, the training of the LLM comprises: taking a LLM partially trained at least on files from enterprise database that do not contain any confidential data; and completing the training using the files containing the encrypted confidential data.

In step 340, by the server, method 300 receives a query from a user, wherein the query comprises a request (i) for searching for the one or more files containing the confidential data or (ii) for obtaining information associated with said one or more files.

In step 350, by the server, method 300 determines whether the user from whom the request is received is one of the one or more authorized users of (i) the one or more files containing the confidential data or (ii) the information associated with said one or more files containing the confidential data. When the user from whom the request is received is one of the one or more authorized users, the method proceeds to step 360. When the user from whom the request is received is not one of the authorized users, the method proceeds to step 395.

In one aspect, the determination of whether the user from whom the request is received is one of the one or more authorized users, includes: identifying one or more files associated with the query received from the user; for each identified file associated with the query received from the user which is among the one or more files containing the confidential data, applying the ACL of the enterprise; and generating the response by executing the inference operation only on the one or more files for which the user's access level is determined as being sufficient.

In step 360, by the server, method 300 generates a response to the query by executing an inference operation using the LLM. For example, the server may prompt an LLM server for a response to the query.

In one aspect, the LLM operation may be implemented on the same server as the server interacting with the user. In another aspect, the server interacting with the user is distinct from the server performing the LLM operations.

In one aspect, the LLM is deployed on a server located in the network of the enterprise. In another aspect, the LLM is deployed on a remote server, which may be a cloud server or a server of a service provider providing LLM functionality to the enterprise.

In step 370, by the server, method 300 provides a response to the query generated by the LLM, wherein, when the response includes the at least one portion of the confidential data that is encrypted, the encrypted portion of the confidential data is decryptable using the decryption key provided to the user of the one or more authorized users.

In one aspect, the generating of the response to the query by executing the inference operation using the LLM comprises: prompting the LLM using encrypted prompts, thereby an LLM hosting platform that performs the inference operation replies to the prompt without decrypting the encrypted at least one portion of confidential data. For example, the prompt from the user is processed by the user interface 210 to generate a vector of features of the prompt. Then, the PHE 222 is used to encrypt the vector and send the resulting encrypted prompt to the LLM server 240. The LLM server 240 operates on the encrypted prompt to generate a response via the LLM inference module 242, and sends the generated response. Then, the response is decrypted by encryption/decryption module 220 and sent to the user interface 210.

In one aspect, the response to the query from the user includes at least encrypted portions of (i) confidential data or (ii) information associated with said one or more files containing the confidential data.

In one aspect, once the computing device of the user receives the response from the server, the computing device of the user decrypts the encrypted portions of the (i) confidential data or (ii) the information associated with said one or more files containing the confidential data, to obtain decrypted data. Then, the computing device of the user presents the decrypted data to the user on a display device associated with the computing device of the user.

Thus, in optional step 380, by the computing device of the user, method 300 decrypts the encrypted portions of the (i) confidential data or (ii) the information associated with said one or more files containing the confidential data, to obtain decrypted data; and presents the decrypted data to the user on a display device associated with the computing device of the user. The method then proceeds to step 320 and/or 340 to continue encrypting newly received confidential data and/or receive queries from users.

In step 395, by the server, method 300 provides a response to the query denying the request. The method then proceeds to step 320 and/or 340 to continue encrypting newly received confidential data and/or receive queries from users.

In one aspect, operations of the enterprise other than the operations provided using the secure LLM are performed on unencrypted data.

In one aspect, operations of the enterprise other than the operations provided using the secure LLM are performed on data encrypted using a Fully Homomorphic Encryption (FHE) algorithm.

In one aspect, the method further comprises: executing steps without decrypting the at least one portion of the confidential data that is encrypted, at least for one of: inference operations, training of algorithms, retraining of algorithms, data preparation and specialization of the algorithm for a specific application.

As described above, during execution of the steps of method 300, the enterprise database is configured to limit access to the confidential data based on an encryption of the confidential data. However, the ACL was an optional feature. The usage of the ACL when it is not optional is further described below in conjunction with FIG. 4. Method 300 mainly uses encryption techniques for data security by providing the decrypting keys only to authorized users. Thus, users of the enterprise network may be provided different decryption keys for accessing different portions of confidential data. Alternatively, a method for providing the secure LLM may use both the encryption and the ACL in an integrated manner.

Figure 4:
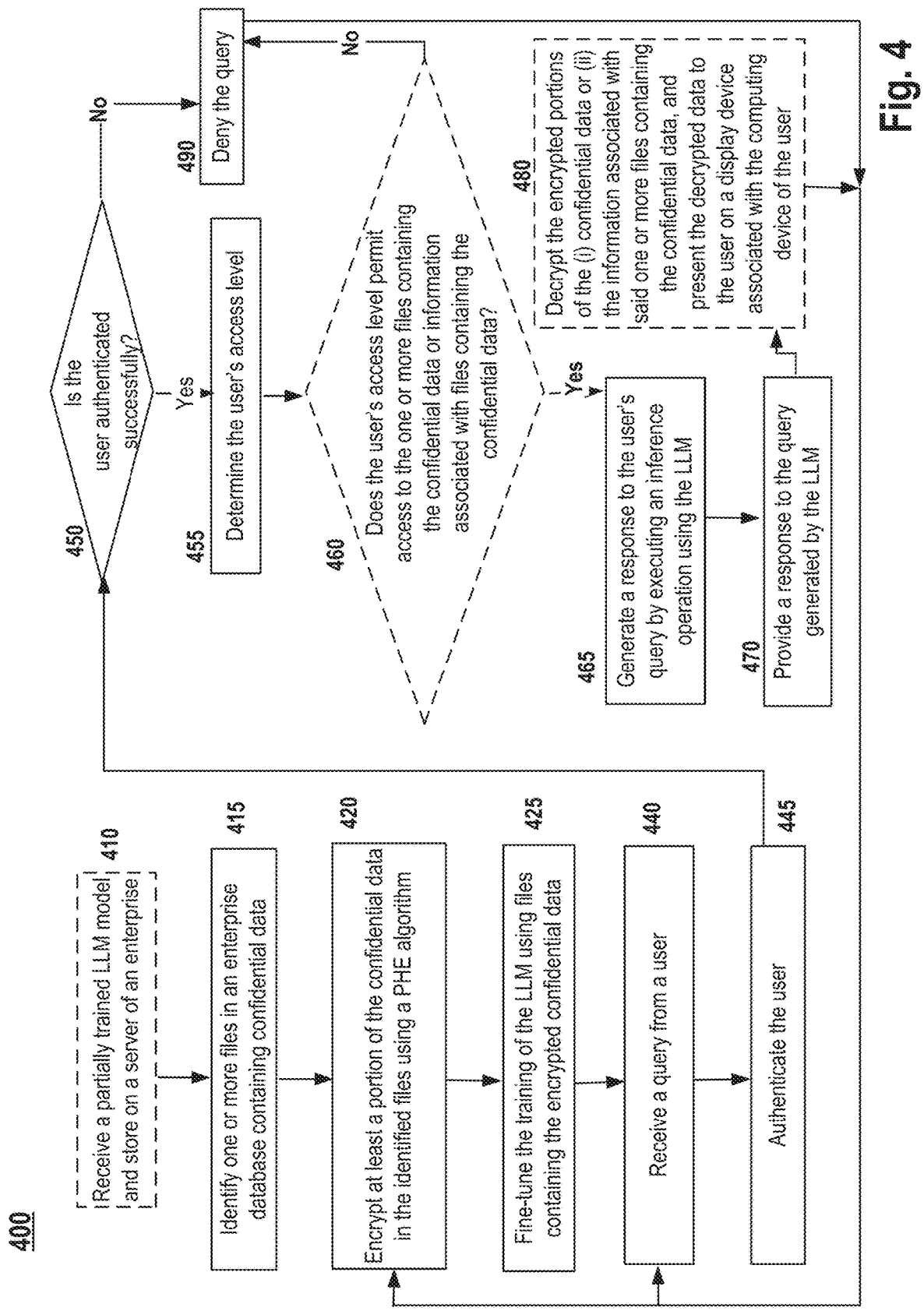
FIG. 4 illustrates an example of a method for providing a secure LLM deployment in an enterprise using encryption and Access Control List (ACL).

FIG. 4 illustrates an example of a method 400 for providing a secure LLM deployment in an enterprise using encryption and Access Control List (ACL) in accordance with aspects of the present disclosure.

In optional step 410, method 400 receives a partially trained LLM algorithm and stores the partially trained LLM on a server, e.g., a server of the enterprise.

In step 415, method 400 identifies one or more files in an enterprise database containing confidential data. The enterprise database is configured to limit access to the confidential data based on an encryption of the confidential data and usage of ACL.

In step 420, by a server, method 400 encrypts at least one portion of the confidential data in the identified files using a PHE algorithm, and provides decryption keys to one or more authorized users of the confidential data.

In step 425, by a server, method 400 fine-tunes the trained LLM using files containing the encrypted confidential data.

In step 440, by the server, method 400 receives a query from a user, wherein the query comprises a request (i) for searching for the one or more files containing the confidential data or (ii) for obtaining information associated with said one or more files.

In step 445, by the server, method 400 authenticates the user.

In step 450, by the server, method 400 determines whether the user is authenticated successfully. When the user is authenticated successfully, method 400 proceeds to step 455. Otherwise, the method proceeds to step 490.

In step 455, by the server, method 400 determines the access level of the user from whom the query is received.

In step 460, by the server, method 400 determines whether the access level of the user permits access to the one or more files containing the confidential data or (ii) the information associated with said one or more files containing the confidential data. When the access level of the user permits access to the confidential data or (ii) information associated with said one or more files, method 400 proceeds to step 465. When the access level of the user does not permit access to the confidential data or (ii) for obtaining information associated with said one or more files, method 400 proceeds to step 490.

In step 465, by the server, method 400 generates a response to the query by executing an inference operation using the LLM.

In step 470, by the server, method 400 provides a response to the query generated by the LLM, wherein, when the response includes the at least one portion of the confidential data that is encrypted, the encrypted portion of the confidential data is decryptable using the decryption key provided to the user of the one or more authorized users.

In optional step 480, by the computing device of the user, method 400 decrypts the encrypted portions of the (i) confidential data or (ii) the information associated with said one or more files containing the confidential data, to obtain decrypted data; and presents the decrypted data to the user on a display device associated with the computing device of the user.

In step 490, method 400 denies the query. The method may then proceed to step 440 to receive more queries, or to step 420 to receive more data for encryption.

In one aspect, the LLM is a 1-bit LLM where an operation of multiplication of matrix to vector is efficiently replaced by changes of sign and addition.

In one aspect, the LLM is deployed on a local enterprise server.

In one aspect, the LLM is deployed on a remote host server.

In one aspect, encrypting at least the confidential data further includes: identifying a plurality of matrix-vector operations, performed during the training of the LLM, that are associated with the confidential data; and encrypting the plurality of identified matrix-vector operations using the PHE algorithm, wherein encrypting further includes: encrypting the confidential data stored in the matrix, and encrypting logical operations performed on vector-matrix.

In one aspect, the response to the user's query includes at least encrypted portions of (i) confidential data or (ii) information associated with said one or more files containing the confidential data.

In one aspect, the determination of whether the user's access level permits access to (i) the one or more files containing the confidential data or (ii) the information associated with said one or more files containing the confidential data, includes: identifying one or more files associated with the user's query; for each identified file associated with the user's query which is among the one or more files containing the confidential data, applying the ACL of the enterprise; and generating the response to the user's query by executing the inference operation only on the one or more files for which the user's access level is determined as being sufficient.

In one aspect, operations of the enterprise other than the operations provided using the secure LLM are performed on unencrypted data.

In one aspect, operations of the enterprise other than the operations provided using the secure LLM are performed on data encrypted using a Fully Homomorphic Encryption (FHE) algorithm.

In one aspect, the method further comprises executing steps without decrypting the at least one portion of the confidential data that is encrypted, at least for one of: inference operations, training of algorithms, retraining of algorithms, data preparation and specialization of the algorithm for a specific application.

In one aspect, the generating of the response to the query by executing the inference operation using the LLM comprises: prompting the LLM using encrypted prompts, thereby an LLM hosting platform that performs the inference operation replies to the prompt without decrypting the encrypted at least one portion of confidential data.

Integrating PHE into training a LLM involves encrypting the sensitive data involved in the training process, such as the training data itself, gradients, or model parameters.

In one aspects, training data is encrypted using PHE before being sent to the training server. This ensures that the data remains confidential throughout the training process. Techniques like additive or multiplicative homomorphic encryption can be used based on the specific operations required during training.

Figure 5:
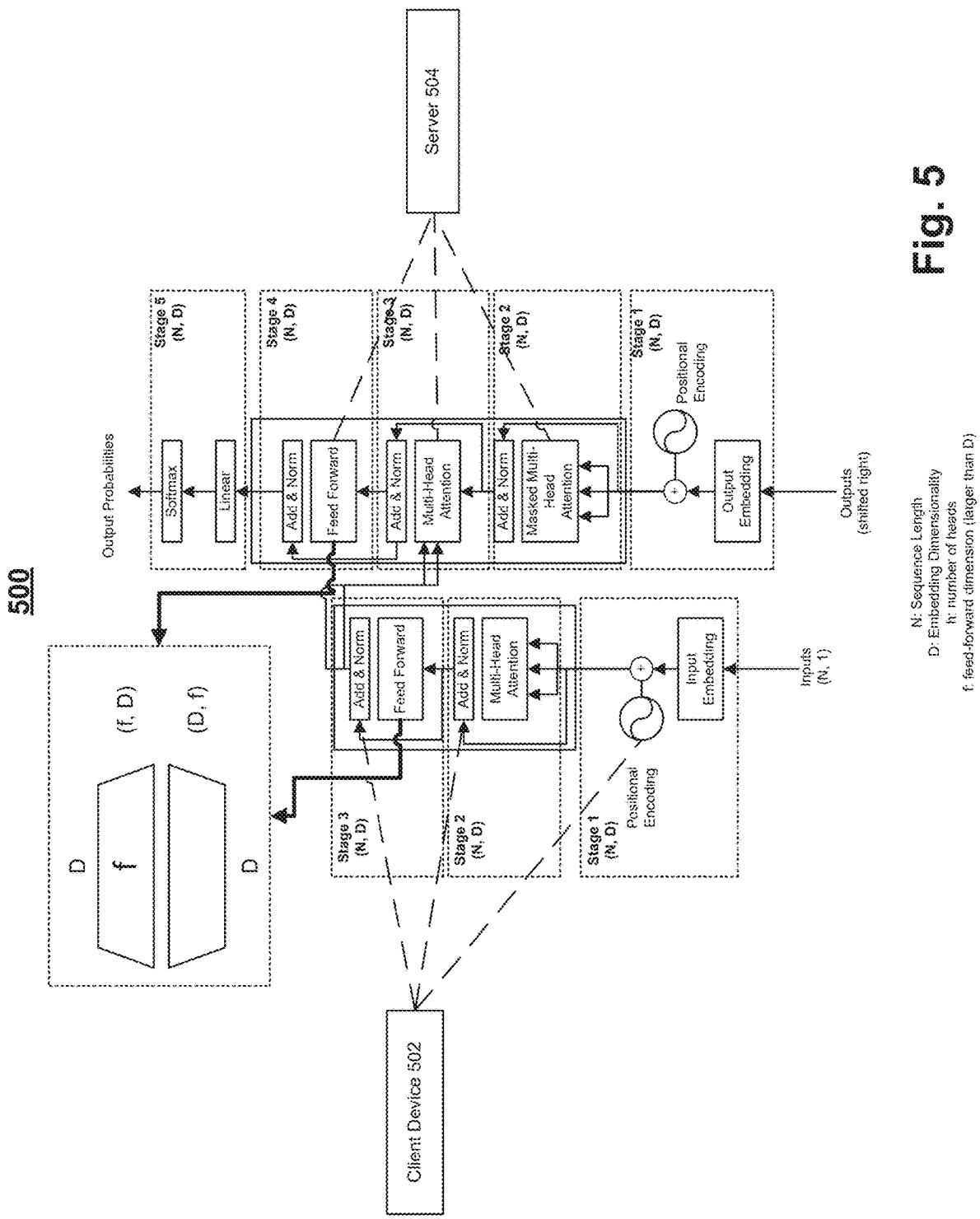
FIG. 5 is a block diagram of an encoder and decoder-based architecture on which encryption is performed.

FIG. 5 is a block diagram of an encoder and decoder-based architecture 500 on which layer-specific encryption is performed. Architecture 500 significantly reduces memory footprint and energy consumption and can be effectively scaled to even larger language models with potential benefits in terms of performance and efficiency. Here, D represents embedding dimensionality and is a small vector, h is a number of heads and is also a small number, and f is a feed-forward dimension, which is a large matrix (implement feed-forward using 1-bit format). The system performs training on encrypted data and to generate 1-bit encrypted matrices.

An encoder is used to analyze user queries and a decoder is used to generate answers to the queries. The encoder may be stacked Nx layers high (multiple encoder layers) and likewise the decoder may be stacked Nx layers high. These layers are distributed over client device 502 (e.g., server 121) and server 504 (e.g., LLM server 140).

In architecture 500, all large weight matrices are in 1-bit format and therefore operations with those matrixes (e.g., linear, feed forward, matmul operations) are encrypted using PHE, and sent from client device 502 in secrecy for training or inference to server 504 hosting other layers of the architecture 500. In some aspects, vectors including embeddings or training data may be encrypted using PHE. Furthermore, operations on matrixes and vectors may be encrypted in PHE.

Architecture 500 is marked showing dimensionality of each stage. A typical transformer architecture includes stacks of attention and feed forward layers. In some aspects, there may be 12 layers.

Linear, feed forward, matmul operations involve matrix-vector multiplication and addition and can be performed in 1-bit format. All other operations, which involve not only multiplication/additions, but other operations, such as normalization operation (e.g., Layernorm) which transforms all numbers in vectors to 0-1 range and involves division operation, and Scaled Dot-Product Attention (shown in FIG. 7), which also involves division and square root operation, cannot be performed in 1-bit format and cannot be PHE encoded. These, operations can be encrypted using other techniques or performed on the client device 502.

For example, in the architecture 500, the positional encoding block involves sin and cosine functions and division and therefore cannot be PHE encoded. Such encoding may be performed on the client device 502.

In another example, the vector input into a feed forward block at stage 3 may be PHE-encrypted by client device 502 and sent to server 504. All weight matrixes stored on the server 504 involving a feed forward operation may be in 1-bit format and PHE encrypted. The server 504 will perform the feed forward operation on the PHE-encrypted vector and PHE-encrypted matrixes, and return a PHE-encrypted result to the client device 502. The client device 502 will decrypt the received data and perform the Add&Norm operation of Stage 3. Then, the client device 502 may encrypt results using PHE and send it back to the server 504 to perform Multi-Head Attention at stage 3 (right-hand column of architecture 500). Masked Multi-Head attention is also performed using 1-bit architecture (where all weights are in 1-bit format).

Figure 6:
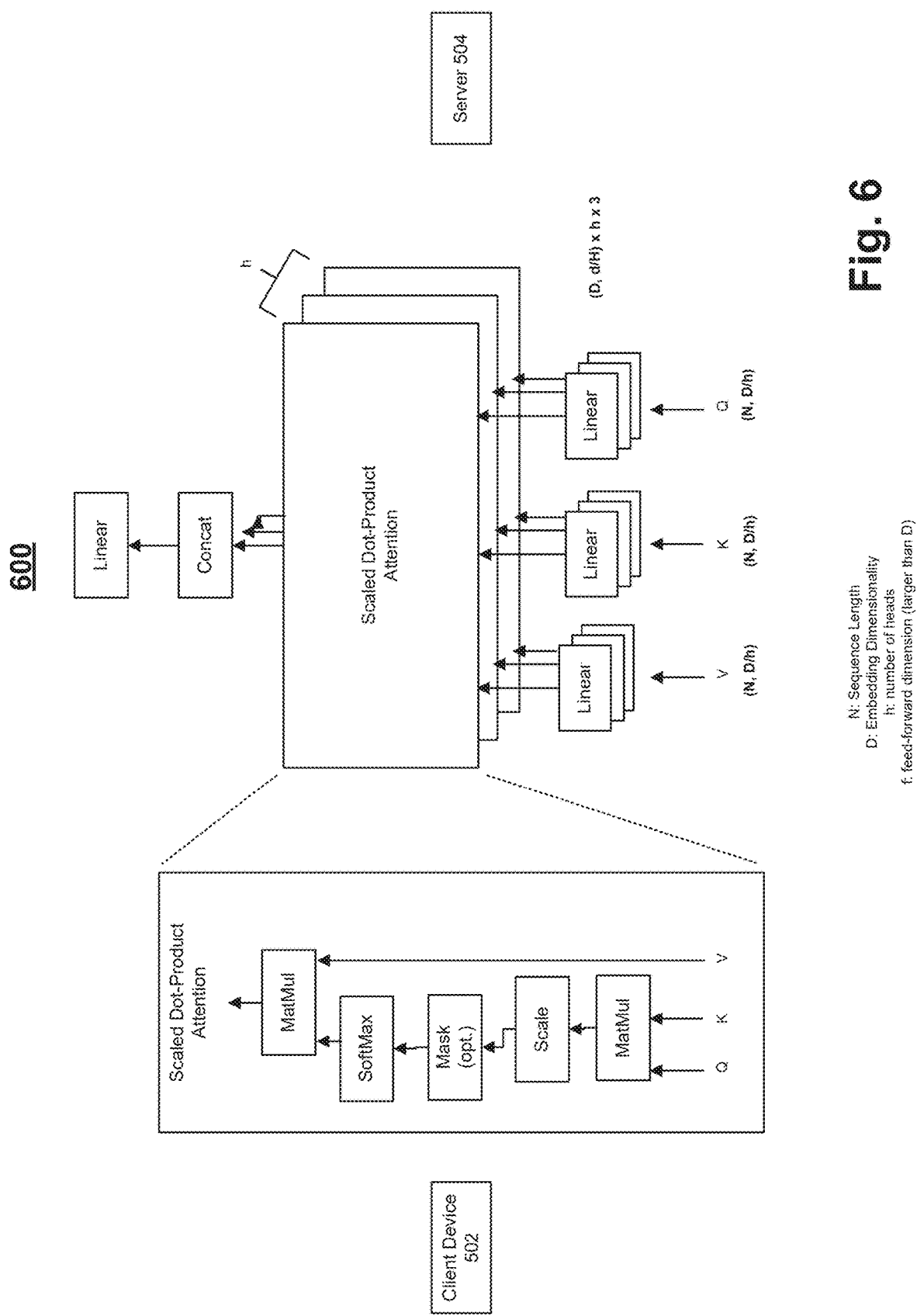
FIG. 6 is a block diagram of a multi-head attention block.

FIG. 6 is a block diagram of a multi-head attention block 600. In some aspects, Multi-Head Attention, which involves a linear operation followed by Scaled Dot-Product Attention, may also be split between the client device 502 and server 504. Linear operations can be performed on PHE encrypted 1-bit matrices, and Scaled Dot-Product Attention, which involves division and square root operation, can be performed on the client device 502 or in FHE encrypted from on the server 504. In fact, the Attention operation has low dimensionality and therefore is not computationally intensive and can be easily performed by the client device 502 in unencrypted form.

The scale block involves division and a square root function and is therefore not compatible with PHE. Softmax involves exponents and division. The Mask block is simply matrix addition and can be 1-bit and PHE encrypted performed on the server. MatMul is matrix multiplication, which can be in 1-bit format, PHE encoded and performed on the server 504.

Compared with regular transformers or other 1-bit LLMs such as BitNet, architecture 500 keeps components high-precision, e.g., 8-bit. In other words, in the BitNet system, 1-bit transformers are trained from scratch (not converted). However, in the present disclosure input and output vectors are still in floating point format (FP16). This is for multiple reasons. First, the residual connections and the layer normalization contribute negligible computation costs to LLMs. Second, the computational cost of QKV transformation is much smaller than the parametric projection as the model grows larger. Third, the precision is preserved for the input/output embedding because the language models have to use high-precision probabilities to perform sampling.

In some aspects, only linear layers are quantized (i.e., in 1-bit format). The quantization is performed per tensor during training while per token during inference for both stability and efficiency.

Figure 7:
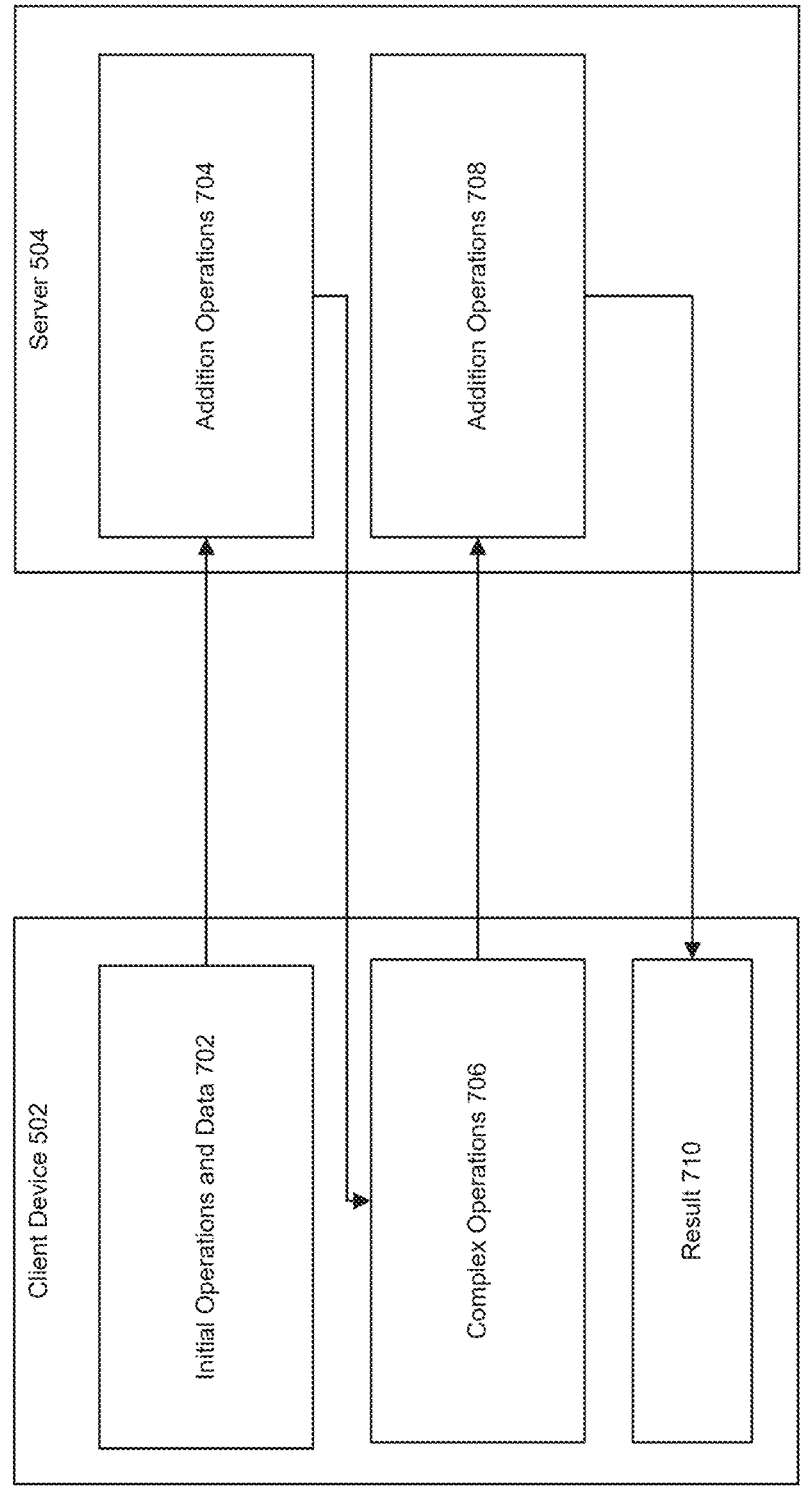
FIG. 7 is a block diagram of a generalized example for performing LLM operations using a client device and a service provider.

FIG. 7 is a block diagram 700 of a generalized example for performing LLM operations using a client device and a service provider. In diagram 700, initial operations and data 702, addition operations 704, complex operations 706, and addition operations 708 are all part of an LLM. For example, the operations may be performed in different layers of the LLM.

Initial operations and data 702 are performed on client device 502. Because addition operations 704 is compatible with PHE, client device 502 may encrypt the input of operations 704 using PHE and transmit them to server 504. The results of operations 704 are returned to client device 502, which may then decrypt the result and perform complex operations 706 that are incompatible with PHE. Because addition operations 708 are compatible with PHE, the results of operations 706 may be encrypted using PHE and transmitted to server 504. Server 504 ultimately transmits result 710 to client device 502, which decrypts the result for presentation to a user.

Figure 8:
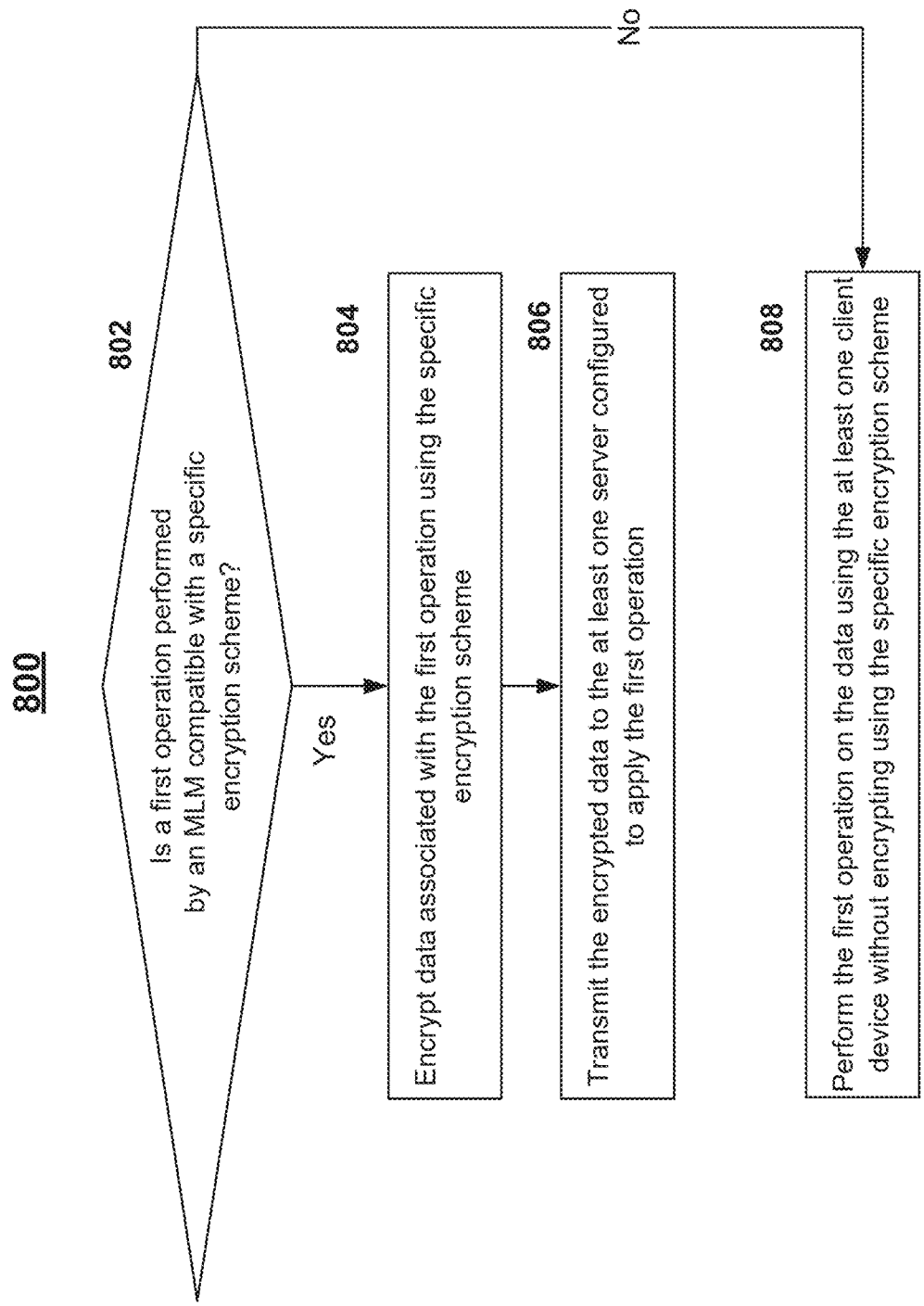
FIG. 8 illustrates another method for securely executing an MLM.

FIG. 8 illustrates method 800 for securely executing an MLM. At 802, module 220 determines whether a first operation performed by an MLM is compatible with a specific encryption scheme. In some aspects, the specific encryption scheme is PHE and the MLM is a 1-bit LLM. It should be noted that in method 800, the MLM is distributed over at least one client device (e.g., client device 502 that is in enterprise network 101) and at least one server (e.g., server 504 that is part of LLM service provider network 102).

Determining the compatibility of a first operation with PHE involves assessing whether the operation can be simplified or transformed into addition operations. This is because PHE schemes typically support a limited set of operations, such as addition, on encrypted data without requiring decryption. For instance, consider matrix multiplication, a common operation in data processing. Matrix multiplication involves a series of multiplications and additions. However, it can be decomposed into a series of addition operations by breaking down the multiplication into repeated addition, which aligns with the capabilities of PHE. Similarly, if the first operation is a linear operation, such as a linear transformation or a linear combination of variables, module 220 can convert this operation into a series of addition operations.

Accordingly, in some aspects, determining whether the first operation is compatible with the specific encryption scheme involves determining whether the first operation can be reduced to one or more addition operations (which are compatible with PHE). Suppose the first operation comprises a linear operation; module 220 may convert the linear operation into one or more addition operations.

In response to determining that the first operation is compatible with the specific encryption scheme, method 800 advances to 804, where module 220 encrypts data associated with the first operation using the specific encryption scheme.

At 806, module 220 transmits the encrypted data to the at least one server configured to apply the first operation. For example, addition operations 704 are compatible with PHE, and accordingly the data that serves as an input to addition operations 704 may be encrypted by client device 502 and sent to server 504.

In response to determining, at 802, that the first operation is incompatible with the specific encryption scheme, method 800 advances to 808, where LLM inference module 242 performs the first operation on the data using the at least one client device without encrypting using the specific encryption scheme. In this case, the operation is performed locally. For example, in FIG. 7, initial operations and data 702 may be incompatible with PHE and are performed on client device 502.

In some aspects, the data is input data provided by a user. Accordingly, the at least one client device (e.g., client device 502) may receive a result of the first operation (e.g., operations 704) from the at least one server (e.g., server 504). Client device 502 may then determine a decrypted value from the result using a decryption key (in datastore 221) associated with the specific encryption scheme.

In some aspects, if that is the final result, user interface 210 may output the decrypted value on the at least one client device.

In some aspects, module 220 may also determine whether a second operation (e.g., complex operations 706) performed by the MLM is compatible with the specific encryption scheme. In response to determining that the second operation is incompatible with the specific encryption scheme, LLM inference module 242 may perform the second operation on the decrypted value using the at least one client device without encrypting using the specific encryption scheme.

Suppose that second operation is also a compatible with the specific encryption scheme. In this case, rather than decrypting the first result and performing encryption again, the second operation may also be performed on a result of the first operation applied to the encrypted data.

Figure 9:
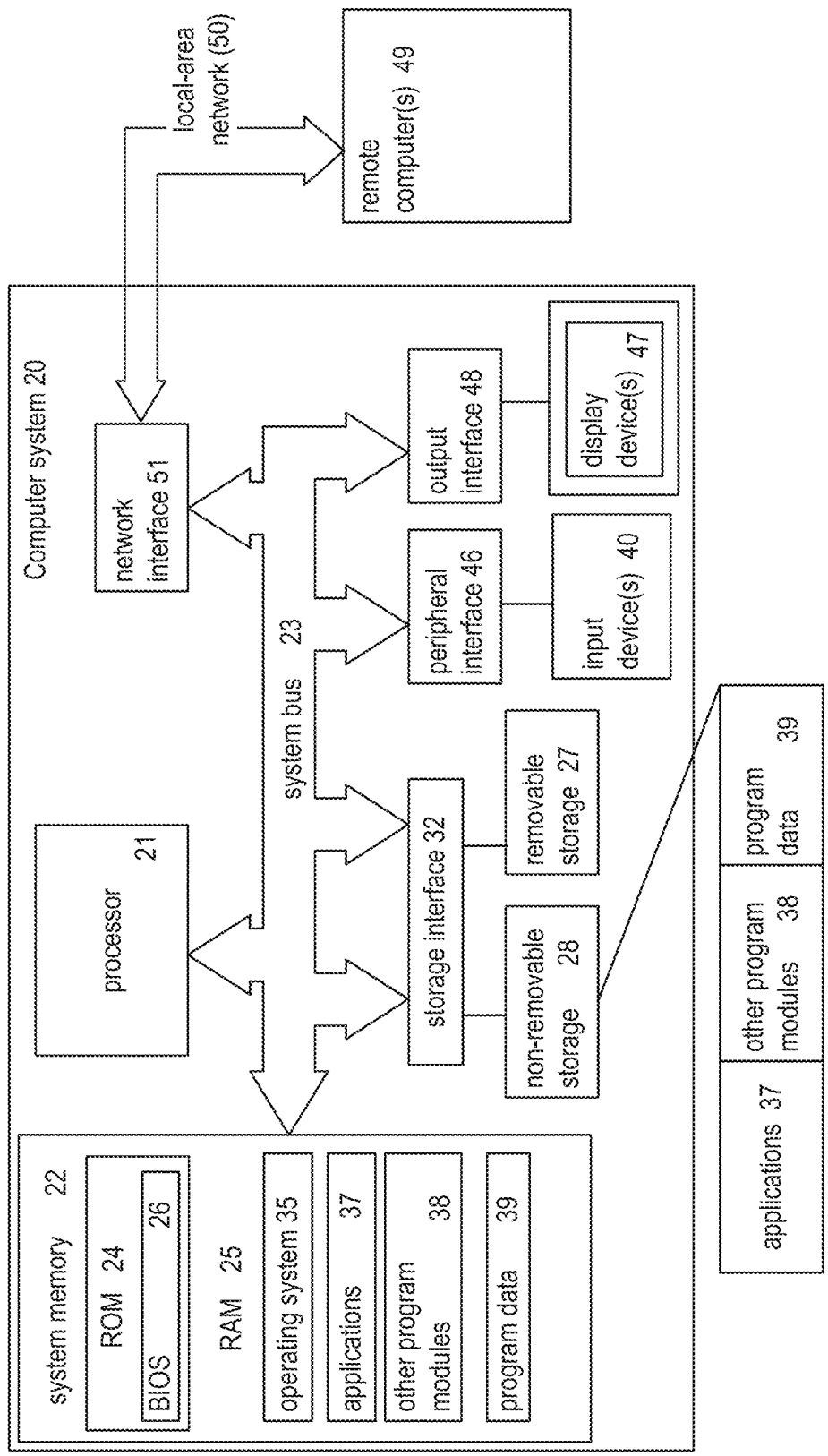
FIG. 9 presents an example of a general purpose computer system on which aspects of a secure LLM deployment in an enterprise can be implemented.

FIG. 9 is a block diagram illustrating a computer system 20 on which aspects of systems and methods for providing a secure LLM deployment in an enterprise may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM)

25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 8 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for securely executing a machine learning model (MLM), the method comprising:
   determining whether a first operation performed by an MLM is compatible with a specific encryption scheme, wherein the first operation is one of an addition operation, a multiplication operation, and a linear operation, and wherein the MLM is distributed over at least one client device and at least one server;
   in response to determining that the first operation is compatible with the specific encryption scheme:
      encrypting data associated with the first operation using the specific encryption scheme; and
      transmitting the encrypted data to the at least one server configured to apply the first operation; and
   in response to determining that the first operation is incompatible with the specific encryption scheme, performing the first operation on the data using the at least one client device without encrypting using the specific encryption scheme.

2. The method of claim 1, wherein the specific encryption scheme is partially homomorphic encryption (PHE).

3. The method of claim 1, wherein the MLM is a 1-bit large language model (LLM).

4. The method of claim 1, wherein the data is input data provided by a user, further comprising:
   receiving, by the at least one client device, a result of the first operation from the at least one server; and
   determining a decrypted value from the result using a decryption key associated with the specific encryption scheme.

5. The method of claim 4, further comprising:
   outputting the decrypted value on the at least one client device.

6. The method of claim 4, further comprising:
   determining whether a second operation performed by the MLM is compatible with the specific encryption scheme;
   in response to determining that the second operation is incompatible with the specific encryption scheme, performing the second operation on the decrypted value using the at least one client device without encrypting using the specific encryption scheme.

7. The method of claim 1, further comprising:
   determining whether a second operation performed by the MLM is compatible with the specific encryption scheme;
   in response to determining that the second operation is compatible with the specific encryption scheme, performing the second operation on a result of the first operation applied to the encrypted data.

8. The method of claim 1, wherein determining whether the first operation is compatible with the specific encryption scheme comprises determining whether the first operation can be reduced to one or more addition operations.

9. The method of claim 1, wherein the first operation comprises matrix multiplication.

10. The method of claim 1, wherein the first operation comprises a linear operation, further comprising:
    converting the linear operation into one or more addition operations.

11. A system for securely executing a machine learning model (MLM), comprising:
    at least one memory; and
    at least one hardware processor coupled with the at least one memory and configured, individually or in combination, to:
       determine whether a first operation performed by an MLM is compatible with a specific encryption scheme, wherein the first operation is one of an addition operation, a multiplication operation, and a linear operation, and wherein the MLM is distributed over at least one client device and at least one server;
       in response to determining that the first operation is compatible with the specific encryption scheme:
          encrypt data associated with the first operation using the specific encryption scheme; and
          transmit the encrypted data to the at least one server configured to apply the first operation; and
       in response to determining that the first operation is incompatible with the specific encryption scheme, perform the first operation on the data using the at least one client device without encrypting using the specific encryption scheme.

12. The system of claim 11, wherein the specific encryption scheme is partially homomorphic encryption (PHE).

13. The system of claim 11, wherein the MLM is a 1-bit large language model (LLM).

14. The system of claim 11, wherein the data is input data provided by a user, wherein the at least one hardware processor is further configured to:
    receive, by the at least one client device, a result of the first operation from the at least one server; and
    determine a decrypted value from the result using a decryption key associated with the specific encryption scheme.

15. The system of claim 14, wherein the at least one hardware processor is further configured to:
    output the decrypted value on the at least one client device.

16. The system of claim 14, wherein the at least one hardware processor is further configured to:
    determine whether a second operation performed by the MLM is compatible with the specific encryption scheme;
    in response to determining that the second operation is incompatible with the specific encryption scheme, perform the second operation on the decrypted value using the at least one client device without encrypting using the specific encryption scheme.

17. The system of claim 11, wherein the at least one hardware processor is further configured to:
    determine whether a second operation performed by the MLM is compatible with the specific encryption scheme;
    in response to determining that the second operation is compatible with the specific encryption scheme, perform the second operation on a result of the first operation applied to the encrypted data.

18. The system of claim 11, wherein the at least one hardware processor is further configured to determine whether the first operation is compatible with the specific encryption scheme by determining whether the first operation can be reduced to one or more addition operations.

19. The system of claim 11, wherein the first operation comprises matrix multiplication.

20. A non-transitory computer readable medium storing thereon computer executable instructions for securely executing a machine learning model (MLM), including instructions for:
    determining whether a first operation performed by an MLM is compatible with a specific encryption scheme, wherein the first operation is one of an addition operation, a multiplication operation, and a linear operation, and wherein the MLM is distributed over at least one client device and at least one server;
    in response to determining that the first operation is compatible with the specific encryption scheme:
        encrypting data associated with the first operation using the specific encryption scheme; and
        transmitting the encrypted data to the at least one server configured to apply the first operation; and
    in response to determining that the first operation is incompatible with the specific encryption scheme, performing the first operation on the data using the at least one client device without encrypting using the specific encryption scheme.

\* \* \* \* \*